United States Patent [19]

Schaich

[11] 4,450,796
[45] May 29, 1984

[54] FOUR-STROKE PISTON ENGINE

[76] Inventor: Josef Schaich, 118 Oschle 7906, Markbronn, Fed. Rep. of Germany

[21] Appl. No.: 318,738

[22] Filed: Nov. 6, 1981

Related U.S. Application Data

[63] Continuation-in-part of Ser. No. 957,661, Nov. 3, 1978, abandoned, which is a continuation-in-part of Ser. No. 854,904, Nov. 25, 1977, abandoned, which is a continuation of Ser. No. 643,165, Dec. 22, 1975, abandoned.

[30] Foreign Application Priority Data

Apr. 12, 1974 [DE] Fed. Rep. of Germany ....... 2461444

[51] Int. Cl.³ .................... F01L 1/28; F02B 3/00
[52] U.S. Cl. .................. 123/79 C; 123/306; 123/309; 123/295; 123/297; 123/296
[58] Field of Search ............ 123/79 C, 309, 301, 123/295, 296, 297, 279, 306

[56] References Cited

U.S. PATENT DOCUMENTS

| | | | |
|---|---|---|---|
| 1,657,108 | 1/1928 | Clemens | 123/79 C |
| 1,786,946 | 12/1930 | Hoffman | 123/79 C |
| 1,828,792 | 10/1931 | Tverbakk | 123/79 C |
| 1,925,614 | 9/1933 | Straussler | 123/79 C |
| 2,269,104 | 1/1942 | Hedlund | 123/301 |
| 2,466,321 | 4/1949 | Mackenzie | 123/301 |
| 2,471,509 | 5/1949 | Anderson | 123/79 C |
| 2,935,055 | 5/1960 | Neir | 123/79 C |
| 3,003,483 | 10/1961 | Buchi | 123/79 C |
| 3,094,974 | 6/1963 | Barber | 123/301 |
| 3,154,059 | 10/1964 | Witzky | 123/301 |
| 3,195,520 | 7/1965 | Simko | 123/301 |
| 3,318,292 | 5/1967 | Hideg | 123/301 |
| 3,504,681 | 4/1970 | Winkler | 123/301 |
| 3,641,986 | 2/1972 | Fricker | 123/301 |

FOREIGN PATENT DOCUMENTS 22950 10/1906 United Kingdom ............ 123/79 C

Primary Examiner—Ronald B. Cox
Attorney, Agent, or Firm—Jeffers, Irish & Hoffman

[57] ABSTRACT

A four-stroke piston engine in which air or a fuel-air mixture is drawn into a cylinder. Fuel may be injected into the air flowing into or already present in the cylinder while a further fuel supply is located on the axis of the cylinder and supplies at least one jet of fuel during the compression stroke, which jet of fuel in cooperation with the fuel-air mixture forms at least one zone of enriched mixture within the cylinder. The piston may have a recess in the upper end into which the fuel nozzle is received when the piston approaches top dead center so that an enriched zone is formed in the recess or in the region of said recess which can be ignited by electrodes disposed adjacent the further fuel supply.

16 Claims, 4 Drawing Figures

FOUR-STROKE PISTON ENGINE

CROSS REFERENCE TO RELATED APPLICATIONS

This is a continuation-in-part of application Ser. No. 957,661 filed Nov. 3, 1978, now abandoned, which is a continuous-in-part of application Ser. No. 854,904 filed Nov. 25, 1977, now abandoned which is a continuation of application Ser. No. 643,165 filed Dec. 22, 1975 now abandoned.

BACKGROUND OF THE INVENTION

The present invention relates to reciprocating piston engines and, in particular, to an engine of this nature in which a piston reciprocates in a cylinder within which fuel-air mixture zones having differences in fuel enrichment are established.

The cylinder, furthermore, comprises a head having channels for establishing directionally oriented gas flow into the cylinder.

It is known to subdivide an engine cylinder to establish chambers to which fuels for different enrichment of the air are supplied. In such engines, the richer mixture is ignited and the mixture of lesser richness is ignited from the richer mixture. Engines of this nature are stable under various load conditions, including constant load, but have a high rate of fuel consumption and are characterized in loss of power because of flow and thermal losses.

It is also known to construct engines in which the cylinder space is not subdivided but which includes devices for generating regions of differing fuel-air mixtures within the cylinder. Such engines have a better fuel economy than the ones referred to above when the engine is under less than full load and, as in connection with the first mentioned engine, have a low quantity of noxious emissions in the exhaust gases. This last mentioned type of engine is, however, unstable in operation.

The object of the present invention is the construction of a reciprocating piston engine in such a manner that mixing zones are established in the cylinder which show different ratios of fuel to air thereby obtaining the advantages of the type of engine in which a richer fuel-air mixture is ignited which, in turn, ignites a lower ratio fuel-air mixture, thus improving thermal efficiency and reducing emission of pollutants.

One object of the present invention is the provision of a reciprocating piston engine of the nature referred to which is stable in operation under all load conditions.

A further object of the present invention is the formation of at least one zone of ignitable fuel-air mixture in the region of the longitudinal axis of the cylinder capable of igniting a zone of basic mixture enclosed by a ring and/or cylinder of pure air.

BRIEF SUMMARY OF THE INVENTION

A basic mixture which is not ignitable by itself may be formed in the piston-swept and compression spaces by means of a vaporizing device or by means of a nozzle injecting fuel into the intake channel or directly into the cylinder, an advantageous arrangement being one whereby a zone of basic mixture encased by a ring of air is formed in the manner described in patent application Ser. No. 643,165.

During operation of the engine, air or fuel-air mixture enters the cylinder. The air is caused to rotate around the axis of the cylinder, preferably by adjustable guide vanes arranged in the region of the inlet valve disk and in th outlet valve. The intake valve is preferably located substantially coaxially on the longitudinal axis of the cylinder, and the intake channel, the guide vanes and the intake valve disk are shaped appropriately so that the air will rotate in the cylinder, substantially without turbulence and peculiarities, during the compression stroke, expansion stroke and exhaust stroke.

In the entire load range the angle of entry as well as the quantity of air/mixture entering the cylinder may be changed by varying the pitch of said movable guide vanes. When the cylinder becomes filled the flow of air/mixture in the cylinder is being superposed with the rotating flow of air/mixture getting in whereby the vortex is directed downwardly, and its direction is reversed from downward to upward with the beginning of the compression stroke while the direction of rotation remains unchanged.

The mixture formation in the piston-swept and compression spaces occurs during operation of the engine by at least one nozzle located within the region of the longitudinal cylinder axis and in the lower part of the compression space.

A number of possibilities exist in connection with the generation of the ignition mixture.

One possibility in connection with the formation of an ignitable mixture is to generate the body of the mixture shortly before ignition takes place and directly in the region of the piston recess and of the nozzle carrier. This can be accomplished by taking into account the operational parameters pertaining to the fuel, the basic mixture and the air and causing at least one jet to impinge upon a spoon-like member, which jet flows out from the nozzle.

The spoon-like member is connected to the piston in the region of the piston recess and extends upwardly therefrom. Its height and position relative to a nozzle carried by the nozzle carrier is arranged such as to trap the fuel last supplied by said nozzle and a few crank angle degrees prior to ignition. The gas flow pushes the cloud of enriched fuel-air mixture to the region of the electrodes. The electrodes are arranged in the region of the nozzle, laterally above said nozzle on the circumference of the nozzle carrier taking into account further parameters.

A further possibility in respect of forming the ignitable mixture is to introduce an appropriate amount of fuel into the mixture flowing in the region of the piston crown and the nozzle carrier toward the end of the formation of the fuel-air mixture by means of the nozzle and to ignite the resulting mixture. In this case, the configuration of the upper surface of the piston and of the piston recess, the time when fuel blow-in is completed, the moment of ignition, the position of the nozzle, the position of the electrodes, the rotational speed of the gases and the amounts of mixture and fuel involved are of importance.

A still further possibility concerning the formation of an ignitable mixture consists in forming the ignitable mixture in a chamber. A substantially cylindrical or spherical recess in the upper end of the piston is substantially closed by the nozzle and electrode carrier when the piston moves in the region of the upper dead center position and forms a chamber. A few crank angle degrees before ignition takes place, when the recess in the piston is substantially closed by the nozzle carrier, liquid or gaseous fuel may be blown/injected into the chamber by means of a nozzle, which for this type of forming the ignitable mixture is expediently disposed on the end face of the nozzle carrier, taking into account the relevant parameters. The burning gases which emerge from the slot between the nozzle carrier and the recess in the piston have high velocity, and can cause turbulence in the mixture in the cylinder in at least the inner region of the space above the piston, which accelerates combustion. In this embodiment of the means for forming the ignitable mixture, the electrodes are disposed on the circumference and/or the face of the nozzle and electrode carrier.

BRIEF DESCRIPTION OF THE DRAWINGS

The exact nature of the present invention becomes more clearly apparent upon reference to the following detailed specification taken in connection with the accompanying drawings in which.

DETAILED DESCRIPTION OF THE INVENTION

Figure 1:
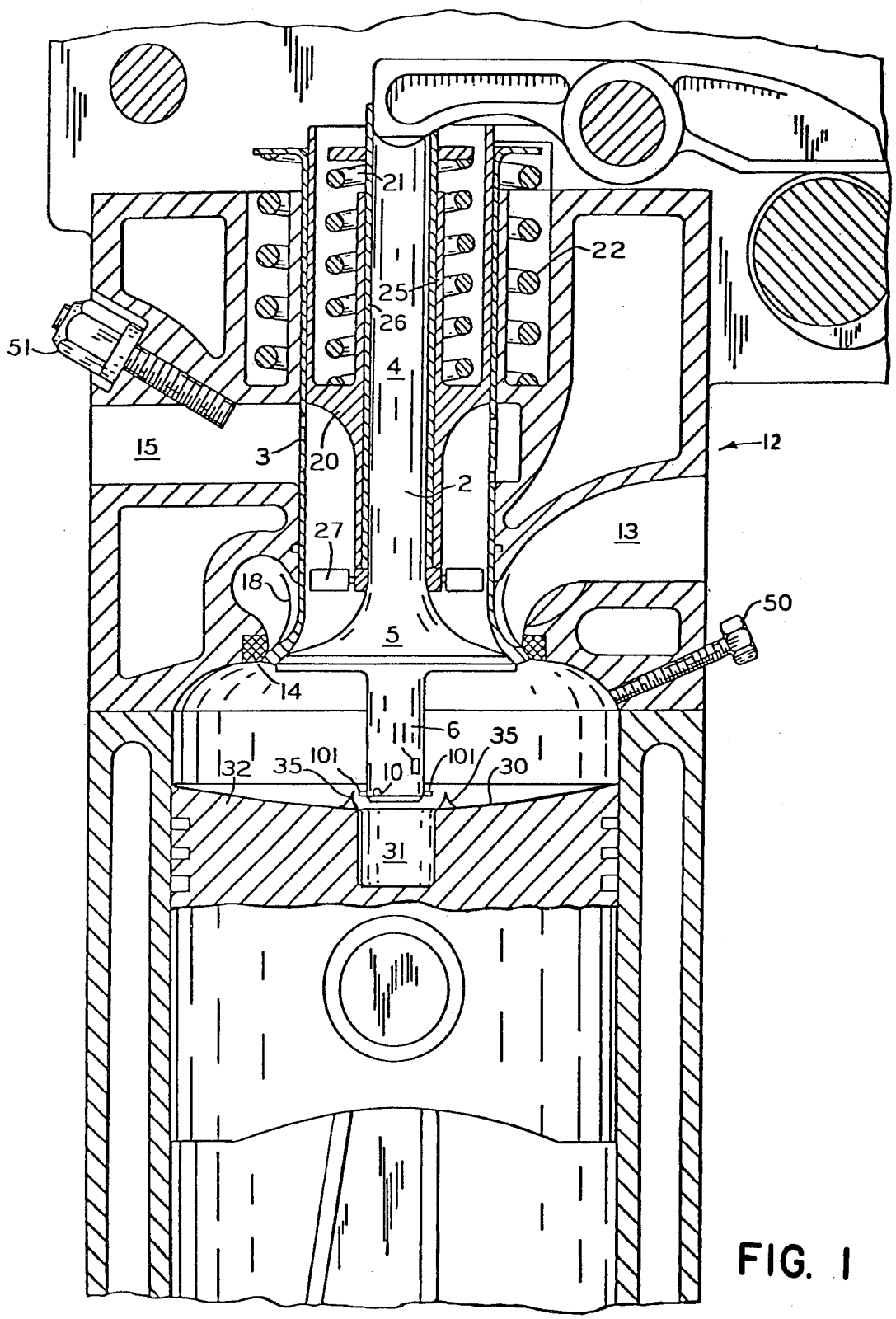
FIG. 1 is a vertical cross-section through an engine cylinder head in accordance with the present invention, showing the position of the piston approximately 45 crank angle degrees before top dead center, referring to approximately 100 mm piston stroke.
Figure 2:
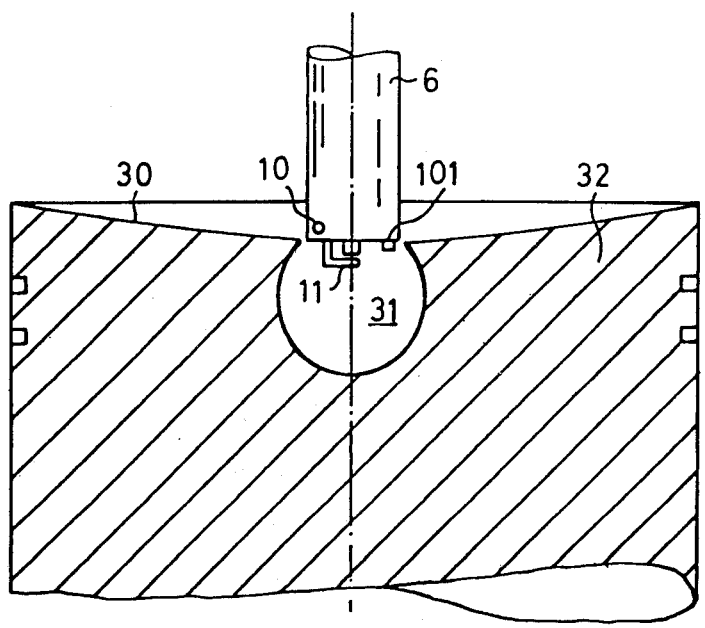
FIG. 2 shows that part of the nozzle and electrode carrier which projects temporarily into the compression space and the spherical recess in the piston.
Figure 3:
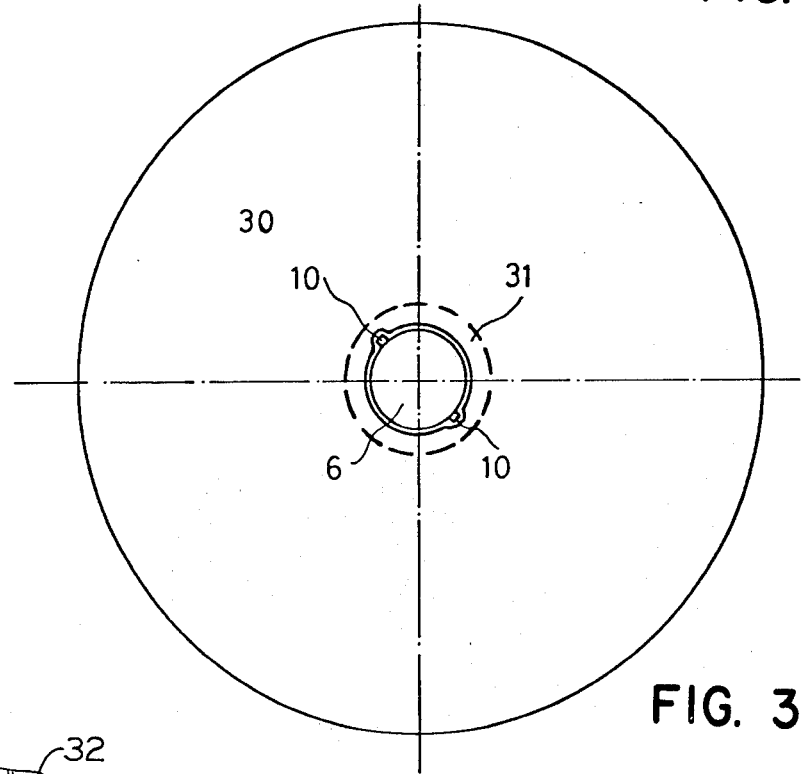
FIG. 3 is a view looking in the axial direction of the cylinder and showing the piston crown, the recess in the piston and the nozzle carrier.
Figure 4:
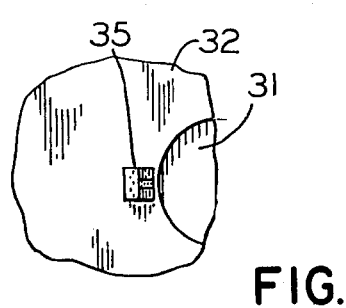
FIG. 4 shows one spoon disposed on the piston crown in the region of the recess in the piston.

Inside the cylinder head 12 is provided an inlet valve 2 which is coaxial with the piston and to the longitudinal axis of the cylinder to which it pertains. Another tubular valve 3 is provided which is coaxial with and surrounds valve 2 and acts as an outlet valve. Valve 2, which consists of a stem 4 and a valve disk 5, is also hollow and carries a nozzle carrier 6 which is screwed into the head end of valve 2 on the axis of the valve, and extends into the lower region of the compression space of the pertaining cylinder.

The nozzle which forms the basic mixture outside the cylinder is indicated at 51.

In addition to fuel lines inside the nozzle carrier 6 is located an electric lead which has not been drawn and which conducts the igniting current to the electrodes 11 located on the nozzle carrier 6. The fuel lines through which the first and second pumps pump fuel to the first nozzles 10, which form the basic mixture alternatively to the nozzle 51, and the second nozzles 101 may incorporate valves through which fuel which builds up in the lines at the end of the mixture formation process may flow back into the tank. Also inside the nozzle carrier 6 is located a control needle (not shown) with appropriate mechanical elements which establishes a connection between a space cam and nozzle needles in the nozzles 10. In order to enable the nozzle carrier 6 to be maintained at the temperature determined by the fuel, especially in the region of the compression space, the nozzle carrier is provided with bores for a heating and cooling fluid.

The first fuel nozzles 10 and the second fuel nozzles 101 are installed in the lower region of the nozzle carrier 6 and the first nozzles 10 are provided with nozzle bores which are essentially radial to the cylinder wall and transverse to the longitudinal axis of the cylinder. The position of the electrodes 11 at the nozzle carrier 6 depends upon the region in which the ignition mixture is located at the very moment when the spark flashes over between the electrodes. The different partial fuels, the ignition current, the heating and cooling fluid, the current to the temperature sensor and the mechanical work for the actuation of the control needle are supplied to the nozzle carrier 6 via flexible leads and mechanical elements.

The outer valve 3, which is movably supported inside the cylinder head 12 in two bores, controls the exhaust channel 13 which annularly encircles the outlet valve 3. The outlet valve 3, when closed, comes to rest upon the valve seat insert 14 located in the cylinder head. The outlet channel 13 is found in the lower region of the cylinder head 12. The inner valve 2, which is movably supported in the sleeve 26, controls the inlet channel 15 which annularly encircles the outlet valve.

Between the inlet channel 15, which is found in the central region of cylinder head 12, and the outlet channel 13, the cylinder head 12 is widened by boring or drilling so that the outer valve 3 can become movably supported. The outer valve 3, in the region of the compression space, serves also for the formation of the outlet and the inlet channels, and it is protected against the hot exhaust gases by a tubular apron 18. In the web portion of the cylinder head which separates the gas channels 13 and 15 from each other, there is provided a sealing and lubricating means for valve 3.

The inlet channel 15 surrounds outer valve 3 and openings in the stem of the outer valve 3 in the region of the inlet channel permit the gas required for the combustion to enter into the inside of tubular outer valve 3. By the action of the inner valve 2, the end of outer valve 3 is closed and opened as the piston reciprocates in the cylinder. The end of outer valve 3 is constructed to form the valve seat for inner valve 2 and the head of valve 3.

Above the inlet channel 15, the outer valve 3 is movably supported in the cylinder head 12.

Fitted into the upper region of the inside of the valve 3, there is provided an insert 20. The insert is fitted into outer valve 3 such that this may shift axially. The insert is held stationary by supports (not shown) which are attached to the cylinder head and reach across the stem of the outer valve. In order to reduce the wear and tear on both of valves 2 and 3, outer valve 3 is permitted to turn intermittently about the longitudinal axis thereof.

Insert 20 has a recess in which valve springs 21 are supported and which engage a valve spring retainer on the inner valve 2. The valve spring 22 for the outer valve 3 rests directly on the cylinder head 12 and acts on a flange on the upper end of valve 3.

Inside the insert 20 are provided two sleeves 25, 26, the outer one 25 of which is integral with the insert 20 and at the lower end is adjacent valve disk 5. Sleeve 25 carries the movable guide vanes 27.

The inner sleeve 26 is rotatably supported in sleeve 25 and extends from the guide vanes 27 upwardly to beyond the upper end of insert 20. Valve 2 is supported in sleeve 26 in a manner permitting it to move axially whereby the supporting of the inner sleeve 26 and of the inner valve 2 occurs essentially without any play. The cam shaft acts via rocker arms upon the valves 2, 3 or upon connection parts at the valve stems. Outer valve 3 may be provided with a valve turning device.

The piston crown 30 has a parabolical or circular depression and incorporates a piston recess 31 in the region of the longitudinal axis. When piston 32 moves in the region of the upper dead center position, part of the nozzle carrier 6 will be in recess 31. Piston crown 30 carries at the rim of piston recess 31 a spoonlike element 35 which faces the second nozzle 101 or the first nozzle 10, and since inlet valve 2 is not allowed to rotate, this situation will occur on each piston stroke.

Sleeve 26 protrudes upwardly beyond insert 20 and is electro-mechanically controlled by means of a control device which evaluates the parameters related to the fuel and the engine and is coupled to the first device controlling the nozzle cross-sections. At the lower end of sleeve 26, the rotary motion by a gear system (not shown) is transferred to the guide vanes 27.

Numerous embodiments of the invention may be visualized. In this connection, reference is made to the subclaims.

An advantageous arrangement is one in which the basic mixture is formed by means of the nozzle(s) 10 during the compression stroke at low load and in which the fuel is vaporized in a chamber disposed between the fuel pump and the nozzle(s) 10. Alternatively, the ignitable mixture may be formed by means of the nozzles 10 outside the recess 31 and in the region of the nozzle carrier and spoon if said nozzles 10 form the basic mixture as described in U.S. patent application Ser. No. 302,993 filed Sept. 17, 1981, which derives from parent application Ser. No. 643,165, in which case an oriented flow is required in the cylinder in order to transport the ignitable mixture into the region of the electrodes. If, on the other hand, the ignitable mixture is formed in the recess 31 of the piston and the basic mixture is formed by the nozzle 51, the pitch angle of the guide vanes may be reduced to a point where substantially no gas rotation occurs in the cylinder.

The ignitable mixture is formed by the nozzles 10 and/or the nozzles 101 in the region of the nozzle carrier and the piston crown taking into account the parameters related to the fuel, the basic mixture and the gas swirl and the construction of the piston and the nozzle carrier. Alternatively, the ignitable mixture may be formed using the said spoon 35 or in the substantially cylindrical or spherical recess in the piston. The most appropriate state of aggregation of the fuel depends on the state of aggregation of the fuel intended for the formation of the basic mixture. For any type of ignition mixture formation it is important that a composition of the mixture be achieved which may be ignited by a normal ignition spark. If the ignitable mixture is formed outside the recess in the piston by the further nozzles 101, it is important that the two partial streams of fuel delivered by the pumps be correlated in a predetermined manner such that the proper value for the air ratio in the 'cloud' of ignitable mixture is obtained. Furthermore, the amount of residual gas flowing in the region of the nozzle carrier and the amount of air flowing out of the recess in the piston during ignition mixture formation if the ignitable mixture is formed outside the recess in the piston must also be taken into account in determining the amount of fuel required to form the ignitable mixture.

Blow-in or injection of the second partial fuel stream for forming the ignitable mixture commences at positions of the piston located about 5 to 50 crank angle degrees before the position of the piston at ignition, depending on how the ignitable mixture is formed.

The second partial fuel stream may be delivered by a second pump, vaporized in a further chamber and fed to the nozzles 101 via appropriate heated lines (cooled if the fuel is injected in the liquid state), these lines being equipped with relief valves like the lines for the first partial fuel stream.

The gas pressure in the cylinder which continues to rise after completion of the mixture forming process causes mixture from the cylinder to enter the line while the nozzles are open and the fuel to flow back into the tank via the briefly opened relief valve so that only the mixture which builds up in the line flows into the cylinder during the expansion stroke.

The relief valve may be omitted if the nozzles 101 are designed as injection valves opening at a predetermined pressure just before the process by which the basic mixture is formed reaches completion.

If the nozzles 101, too, are disposed on the circumference of the nozzle carrier, the outwardly directed openings may feature any of a number of different circumferential and axial components with respect to the longitudinal axis of the cylinder. If the nozzle 101 is disposed on the face of the nozzle carrier with an axially directed discharge opening, said opening may feature any of a number of different radial components.

In one embodiment of the invention, the fuel for the formation of ignitable mixture 'clouds' is directed by means of two nozzles 101, which are disposed at an angle of 180° to each other, on an inclined path downwardly against the two spoons 35 provided on the piston crown which are also offset against each other by 180°, and which are located opposite the nozzles 101 before or during ignition. The spoons may also be arranged on the nozzle carrier 6 opposite the nozzles 101.

In order to achieve symmetrical flame propagation also if the 'clouds' of ignitable mixture are formed outside the recess in the piston, two pairs of electrodes, offset against each other by 180°, are provided on the circumference of the nozzle carrier in the region of the nozzles 10 or 101. The circumference of the recess 31 in the piston is shaped so as to prevent the piston from coming into contact with the electrodes and to provide room for the 'clouds' of ignitable mixture.

If the recess 31 in the piston is spherical, it may be advantageous to keep the gap between the nozzle carrier and the case of the recess in the piston crown very narrow and to provide two appropriately shaped enlargements at the edge of the recess and to dispose these enlargements opposite each other. A compact, hot ignition jet is discharged from each of the said two recesses after ignition. The nozzles 101 and the electrodes 11 are then disposed in the region of the end face of the nozzle carrier.

The recess in the spoon 35 may be replaced by a channel which runs out helically from the spoon 35 into the recess 31 of the piston in order to direct the fuel discharged from the downwardly slanting nozzles 101 or the nozzles 10 into the recess 31, whereby the enriched ignitable mixture which forms in the recess 31 becomes ignited by the electrodes located on the nozzle carrier 6 in the nozzle region and on the circumference of the nozzle carrier and/or by the electrodes provided on the end face of the nozzle carrier.

The efficiency of the igniting spark may be increased if the edge of the recess in the piston is constructed as a second electrode and if, in addition, the piston, the engine housing and the piston rod are connected to each other in an electrically conducting manner.

The most appropriate placing of the electrodes on the circumference and in the region of the end face of the nozzle carrier will depend upon the position of the ignition mixture at the moment of sparking.

The spoons 35 provided in the region of the recess in the piston swirl the flow in the region of the nozzle carrier. Further swirl generators may be provided in the region of the recess in the piston in order to increase microturbulence. Microturbulence facilitates the formation of the ignitable mixture, reduces the rate of flow in the region of the electrodes and mixes the residual gas flowing around the nozzle carrier with fresh gas. Discontinuous combustion and pressure fluctuations in the cylinder are avoided. An advantageous design is one in which the intake port is funnel-shaped in the region of the cylinder head in order to further reduce turbulence in the inflowing air. Engine control may be effected by varying the volume of the basic mixture and its air ratio.

The advantages obtainable from practice of the invention are described below.

An important advantage is the result that, when lean mixtures are burned, the maximum flame temperature becomes lowered, which brings about three essential improvements: the thermal and frictional losses decrease, the dissociation is lower and, as the gas taken in is only slightly throttled, the pumping losses are reduced. The thermal efficiency of the engine due to these improvements is greatly raised.

The reduction of the maximum flame temperatures causes a considerable drop in the amount of oxides of nitrogen in the exhaust gas. As combustion occurs in a space in which the volume of the ignition mixture is small, no zones of a high flame temperature are created, thus the creation of nitrogen oxides is considerably reduced.

As there is, furthermore, an excess of air in the basic mixture and because the volume of the ignition mixture zone is so small, the arising of carbon monoxide is prevented in addition.

A further important advantage results from the possibility of igniting a mixture encased by a ring of air. The advantages resulting from the combustion of a mixture encased by a ring of air are described in U.S. patent application Ser. No. 643,165.

What is claimed is:

1. A piston engine comprising: a cylinder having an internal wall, a cylinder head, a piston reciprocatingly received in said cylinder and defining a compression space in said cylinder, an outlet channel and an outlet valve, an inlet channel in said cylinder head communicating with the cylinder through an inlet port, and end portion of said inlet channel and said inlet port being substantially coaxial with said cylinder, an inlet valve disposed substantially coaxially with the longitudinal axis of said cylinder being received in said cylinder head and closing said inlet port, a nozzle carrier carried by said inlet valve having an end projecting beyond said inlet valve and into the compression space and being temporarily received in a recess in the piston crown on part of its length, at least one nozzle means and one ignition device being provided on said nozzle carrier to form an ignitable mixture in the region of the longitudinal axis of said cylinder, and two spoons provided on the piston crown, said spoons being located opposite respective nozzles for forming the ignitable mixture at predetermined times.

2. A piston engine comprising: a cylinder having an internal wall, a cylinder head, a piston reciprocatingly received in said cylinder and defining a compression space in said cylinder, an outlet channel and an outlet valve, an inlet channel in said cylinder head communicating with the cylinder through an inlet port, an end portion of said inlet channel and said inlet port being substantially coaxial with said cylinder, an inlet valve disposed substantially coaxially with the longitudinal axis of said cylinder being received in said cylinder head and closing said inlet port, a nozzle carrier carried by said inlet valve having an end projecting beyond said inlet valve and into the compression space and being temporarily received in a recess in the piston crown on part of its length, at least one nozzle means and one ignition device being provided on said nozzle carrier to form an ignitable mixture in the region of the longitudinal axis of said cylinder, and two enlargements disposed opposite each other at the edge of the piston recess.

3. A piston engine comprising: a cylinder having an internal wall, a cylinder head, a piston reciprocatingly received in said cylinder and defining a compression space in said cylinder, an outlet channel and an outlet valve, an inlet channel in said cylinder head communicating with the cylinder through an inlet port, an end portion of said inlet channel and said inlet port being substantially coaxial with said cylinder, an inlet valve disposed substantially coaxially with the longitudinal axis of said cylinder being received in said cylinder head and closing said inlet port, means for imparting a helical movement to air unmixed with fuel about the longitudinal axis of the cylinder during the intake of the air into the cylinder, the helically flowing air being drawn into the cylinder substantially turbulence-free to form a cylinder of helically flowing air in the piston-swept and compression space, a nozzle carrier carried by said inlet valve having an end projecting beyond said inlet valve and into the compression space of the cylinder, at least one nozzle means and ignition device being provided on said nozzle carrier, and a recess provided in the piston crown which enables the piston temporarily to envelope said nozzle carrier on part of its total length.

4. A piston engine as claimed in claim 3, characterized in that one nozzle for forming the ignitable mixture is provided on the end face of the nozzle carrier.

5. A piston engine as claimed in claim 1, characterized in that the spoon has a recess or trough oriented toward the discharge opening of the nozzle.

6. A piston engine as claimed in claim 3, characterized in that the recess provided in the piston crown is substantially cylindrical in shape.

7. A piston engine as claimed in claim 3, characterized in that the recess provided in the piston crown is substantially spherical in shape.

8. A piston engine as claimed in claim 3, characterized in that pairs of electrodes are provided on the circumference of the nozzle carrier.

9. A piston engine as claimed in claim 3, characterized in that pairs of electrodes are provided on the end face of the nozzle carrier.

10. A piston engine as claimed in claim 1, characterized in that a channel is provided which extends from at least one spoon into the recess in the piston.

11. A piston engine as claimed in claim 7, characterized in that the nozzle carrier substantially closes the spherical recess provided in the piston crown at a predetermined position of the piston.

12. The piston engine as claimed in claim 3 characterized in that said means for imparting rotating movement to the air is provided in said inlet port.

13. The piston engine as claimed in claim 3 characterized in that two nozzle means are provided on the circumference of said nozzle carrier, said nozzles being disposed at an angle of 180° to each other.

14. A piston engine as claimed in claim 3 including a spoon on the piston in the region of the recess.

15. A piston engine as claimed in claim 3 including at least one electrode on the circumference of the nozzle carrier.

16. A piston engine as claimed in claim 3 including at least one electrode on the end face of the nozzle carrier.

* * * * *

UNITED STATES PATENT AND TRADEMARK OFFICE
CERTIFICATE OF CORRECTION

PATENT NO. : 4,450,796
DATED : May 29, 1984
INVENTOR(S) : Josef Schaich

It is certified that error appears in the above—identified patent and that said Letters Patent is hereby corrected as shown below:

```
Column 7, line 50, delete "valve", insert therefor --device--.
Column 8, line  3, delete "valve", insert therefor --device--.
Column 8, line 22, delete "valve", insert therefor --device--.
```

Signed and Sealed this

Eighth Day of January 1985

[SEAL]

Attest:

*Attesting Officer*

GERALD J. MOSSINGHOFF

*Commissioner of Patents and Trademarks*

UNITED STATES PATENT AND TRADEMARK OFFICE
CERTIFICATE OF CORRECTION

PATENT NO. : 4,450,796
DATED : May 29, 1984
INVENTOR(S) : Josef Schaich

It is certified that error appears in the above-identified patent and that said Letters Patent is hereby corrected as shown below:

In the Abstract page, under the heading "Foreign Application Priority Data", delete:

"April 12, 1974 [DE] Fed. Rep. of Germany ....... 2461444"

and substitute therefor

--June 30, 1975 [DE] Fed. Rep. of Germany ....... 2529074--

Signed and Sealed this

Twenty-ninth Day of October 1985

[SEAL]

Attest:

Attesting Officer

DONALD J. QUIGG

Commissioner of Patents and Trademarks—Designate